United States Patent
Toyokura et al.

(10) Patent No.: US 6,320,906 B1
(45) Date of Patent: *Nov. 20, 2001

(54) MOTION VECTOR DETECTING CIRCUIT

(75) Inventors: Masaki Toyokura, Hyogo; Takuya Jinbo, Osaka, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,428

(22) Filed: May 20, 1997

(30) Foreign Application Priority Data

May 21, 1996 (JP) .................................. 8-125429

(51) Int. Cl.$^7$ ...................................... H04N 7/12
(52) U.S. Cl. ...................................... 375/240.16
(58) Field of Search .................................. 348/404, 405, 348/406, 407, 412, 413, 420, 421, 699, 384, 400, 401, 402, 415, 409, 416, 390

(56) References Cited

U.S. PATENT DOCUMENTS

| | | | |
|---|---|---|---|
| 5,200,820 | * 4/1993 | Gharavi | 348/416 |
| 5,235,419 | * 8/1993 | Krause | 348/416 |
| 5,502,492 | * 3/1996 | Jung | 348/416 |
| 5,526,295 | * 6/1996 | Astle | 708/203 |
| 5,557,341 | * 9/1996 | Weiss | 348/699 |
| 5,561,475 | * 10/1996 | Jung | 348/699 |
| 5,576,767 | * 11/1996 | Lee | 348/416 |
| 5,608,652 | * 3/1997 | Astle | 708/203 |
| 5,638,310 | * 6/1997 | Artieri | 708/308 |
| 5,691,774 | * 11/1997 | Yasuda | 348/413 |
| 5,790,207 | * 8/1998 | Jung | 348/699 |

FOREIGN PATENT DOCUMENTS

| | | |
|---|---|---|
| 5-292489 | 11/1993 | (JP) . |
| 5-328333 | 12/1993 | (JP) . |
| 6-178284 | 6/1994 | (JP) . |

\* cited by examiner

*Primary Examiner*—Chris Kelley
*Assistant Examiner*—Allen Wong
(74) *Attorney, Agent, or Firm*—McDermott, Will & Emery

(57) ABSTRACT

In an animation encoding process, a motion vector which can minimize an AC component included in a discrete cosine transform result is detected. For this purpose, a block X (i, j) to be processed is extracted from an input image X, and a prospective reference block $Y_k$ (i, J) is extracted from a reference image Y, wherein k is an integer depending upon the size of a motion vector search range, i=0, ... , or 3, and j=0, ... , or 63. From each pixel value in each sub block (including 8×8 pixels) of the block to be processed, an average value $X_a$ (i) of pixels in the sub block is subtracted, and from each pixel value in each sub block (including 8×8 pixels) of the prospective reference block, an average value $Y_{ka}$ (i) of pixels in the sub block is subtracted. Then, an evaluation value $S_k$ for block matching is calculated. The prospective reference block having the minimum evaluation value is selected as a reference block among the plural prospective reference blocks, so as to obtain a motion vector V corresponding to the positional relationship between the block to be processed and the reference block.

5 Claims, 18 Drawing Sheets

| $X(0,j)$ | $X(1,j)$ |
|---|---|
| $X(2,j)$ | $X(3,j)$ |

$Y_k(i,j)$

| $Y_k(0,j)$ | $Y_k(1,j)$ |
|---|---|
| $Y_k(2,j)$ | $Y_k(3,j)$ |

$Z_k(i,j)$

| $Z_k(0,j)$ | $Z_k(1,j)$ |
|---|---|
| $Z_k(2,j)$ | $Z_k(3,j)$ |

$j = 0, 1, \cdots, 63$

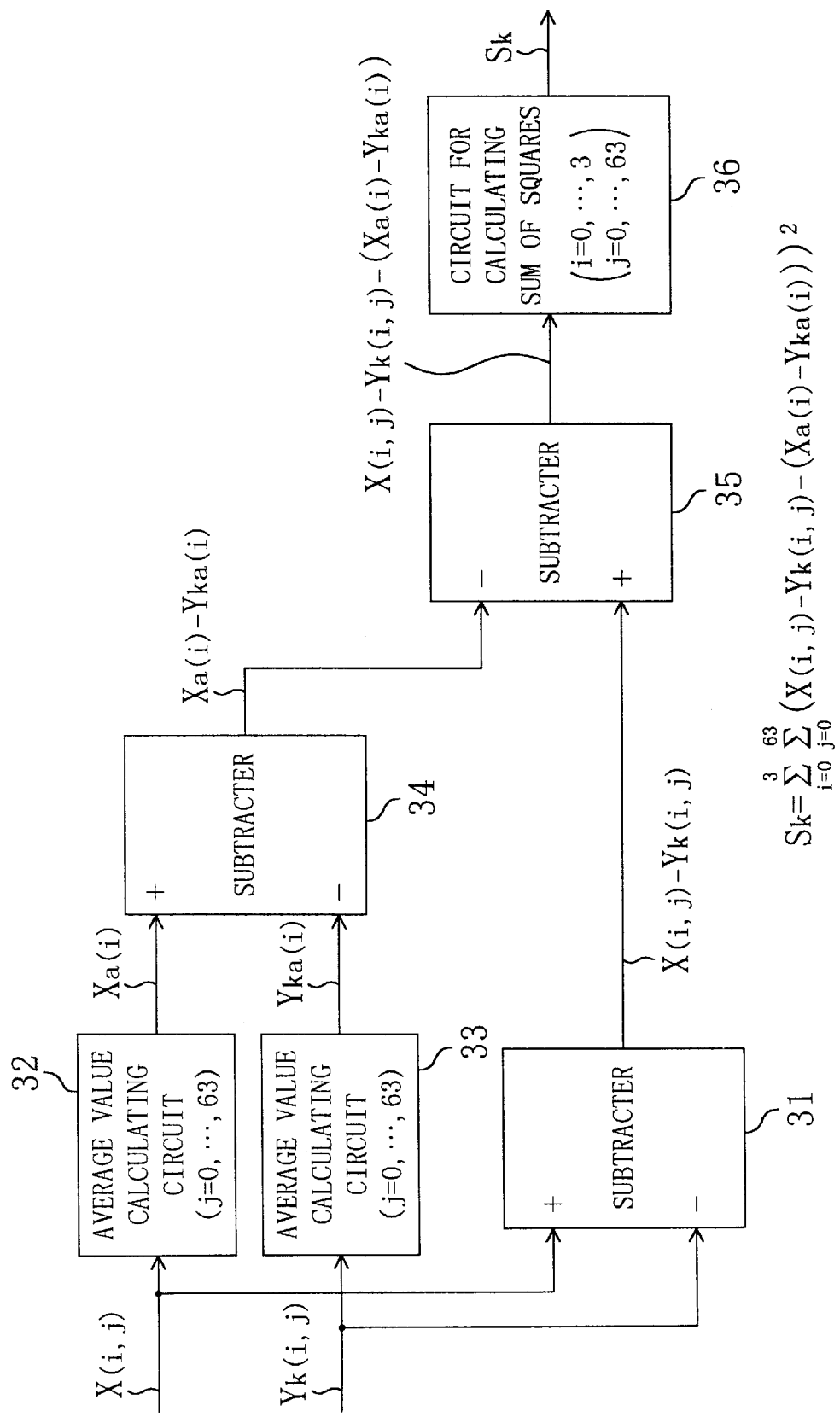

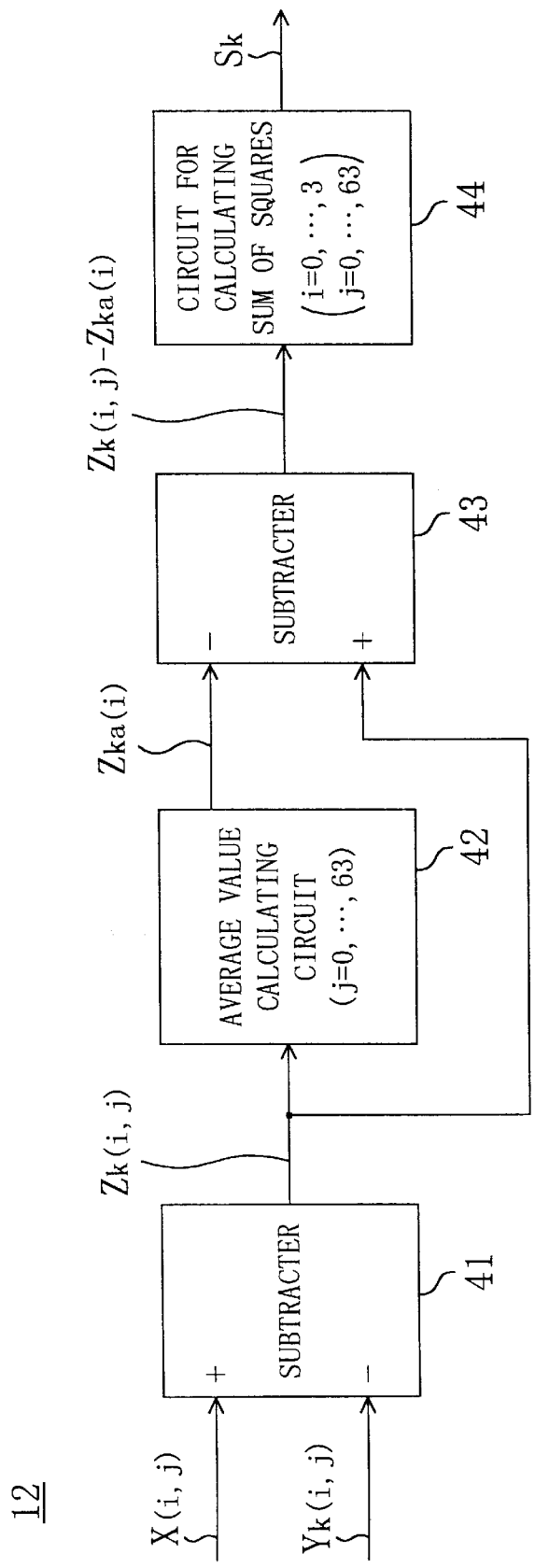

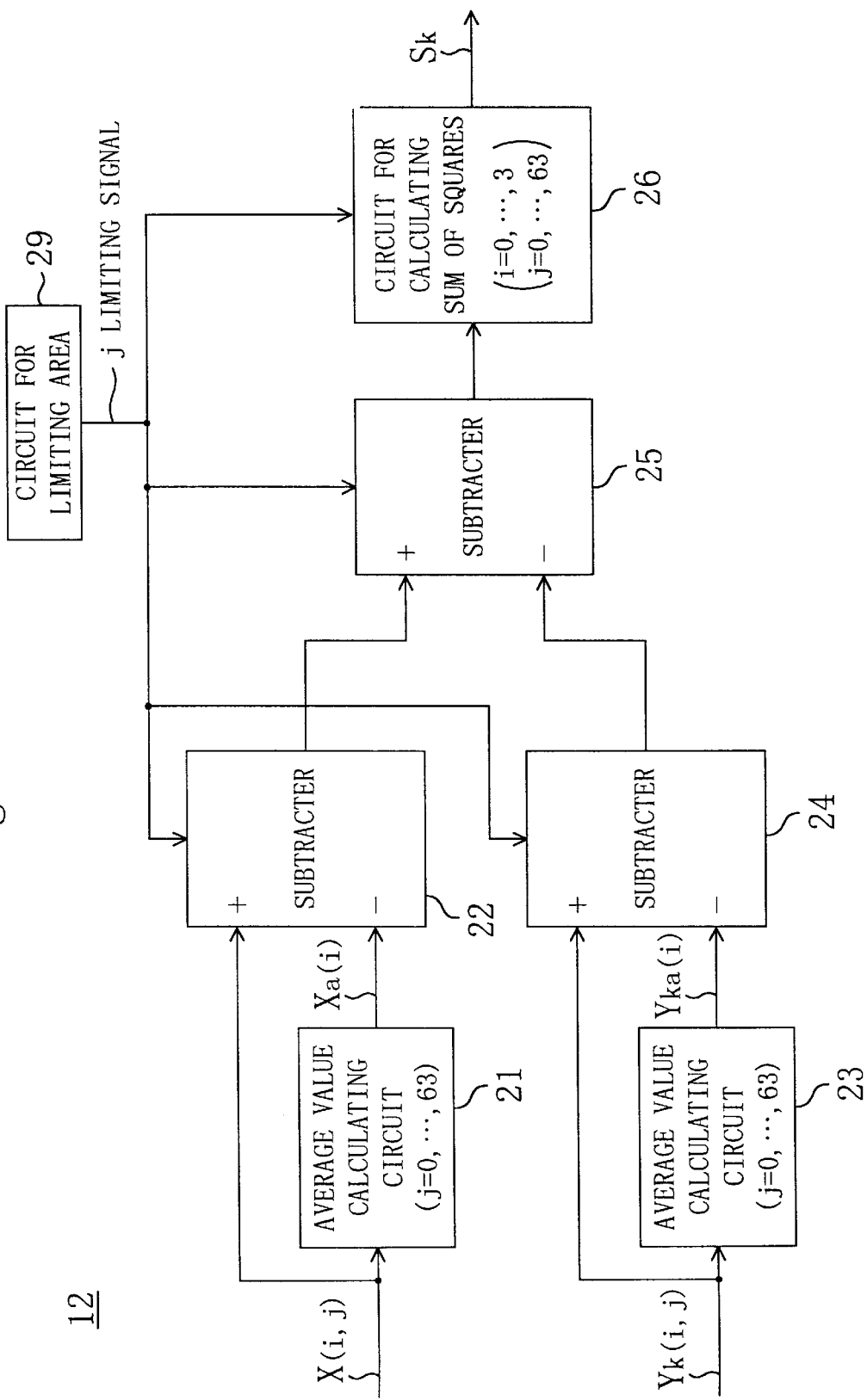

MOTION VECTOR DETECTING CIRCUIT

BACKGROUND OF THE INVENTION

The present invention relates to a circuit for detecting a motion vector corresponding to the size and the direction of movement of an image.

Various types of animation encoding standards adopt motion-compensated predictive coding. In the motion compensated predictive coding, a motion vector in an image to be encoded is detected and motion compensation is effected on the basis of the detected motion vector before intra-frame prediction. The result of the intra-frame prediction (i.e., a difference between a succeeding frame and a preceding frame) is subjected to discrete cosine transform (DCT). The detection of the motion vector and the motion compensation is carried out with a block comprising 16×16 pixels (i.e., a macro block) used as a unit, and the DCT is carried out with a sub block comprising 8×8 pixels used as a unit.

Conventionally, a motion vector is detected in an input image and a reference image by a technique designated as block matching. In the block matching, a block to be processed (comprising 16×16 pixels) is first extracted from an input image, and a plurality of prospective reference blocks (each comprising 16×16 pixels) are extracted from a certain search range in a reference image. Then, with regard to each of the plural prospective reference blocks, an evaluation value indicating similarity with the block to be processed is calculated. This evaluation value is calculated as a sum of squares of differences in the pixel values between these blocks or as a sum of absolute values of the differences in the pixel values between these blocks. One prospective reference block, among the plural prospective reference blocks, having the minimum evaluation value, namely, one which is most similar to the block to be processed, is selected as a reference block. Ultimately, a motion vector corresponding to the positional relationship between the block to be processed and the reference block is determined.

However, when brightness variation such as a flicker and fade-in/fade-out is caused in the input image, namely, when a DC component is varied in the input image, a precise motion vector cannot be detected. Therefore, Japanese Laid-Open Patent Publication No. 5-292489 discloses a method of estimating a motion vector as a countermeasure against this problem. In this method, an average value of all the pixels in an input image is subtracted from each of the pixel values in a block to be processed (comprising 16×16 pixels), and an average value of all the pixels in a reference image is subtracted from each of the pixel values in a prospective reference block (comprising 16×16 pixels), and thereafter, an evaluation value for the block matching is calculated. Alternatively, Japanese Laid-Open Patent Publication No. 6-178284 discloses a motion vector detecting circuit. In this circuit, an average value of pixels in a block to be processed (comprising 16×16 pixels) is subtracted from each of the pixel values in the block to be processed, and an average value of pixels in a prospective reference block (comprising 16×16 pixels) is subtracted from each of the pixel values in the prospective reference block, and thereafter, an evaluation value for the block matching is calculated.

In the aforementioned conventional techniques, however, an AC component included in a DCT result obtained from an image difference cannot be minimized. Therefore, encoding efficiency cannot be improved.

SUMMARY OF THE INVENTION

The object of the invention is realizing motion vector detection which can minimize an AC component included in a DCT result obtained from a frame difference.

In order to achieve this object, an average pixel value obtained in each processing unit of the DCT, namely, each sub block, is used in removal of a low frequency component including a DC component in this invention. Specifically, from each of pixel values in each sub block (comprising 8×8 pixels) in a block to be processed (comprising 16×16 pixels), an average value of the pixels in the sub block is subtracted, and from each of pixel values in each sub block (comprising 8×8 pixels) in a prospective reference block (comprising 16×16 pixels), an average value of the pixels in the sub block is subtracted. Thereafter, an evaluation value for block matching is calculated. At this point, each prospective reference block can be provided with one evaluation value, or each sub block can be provided with one evaluation value.

BRIEF DESCRIPTION OF THE DRAWINGS

FIG. 2 is a diagram for showing a method of obtaining four differential sub blocks (each comprising 8×8 pixels) to be transformed through the discrete cosine transform;

FIG. 7 is a block diagram for showing another exemplified inside configuration of the evaluation value calculating circuit of FIG. 3;

FIG. 8 is a block diagram for showing still another exemplified inside configuration of the evaluation value calculating circuit of FIG. 3;

FIG. 16 is a block diagram for showing another modification of the evaluation value calculating circuit of FIG. 4;

DETAILED DESCRIPTION OF THE INVENTION

Now, specific embodiments of a motion vector detecting circuit of this invention will be described with reference to the accompanying drawings.

Figure 1A:
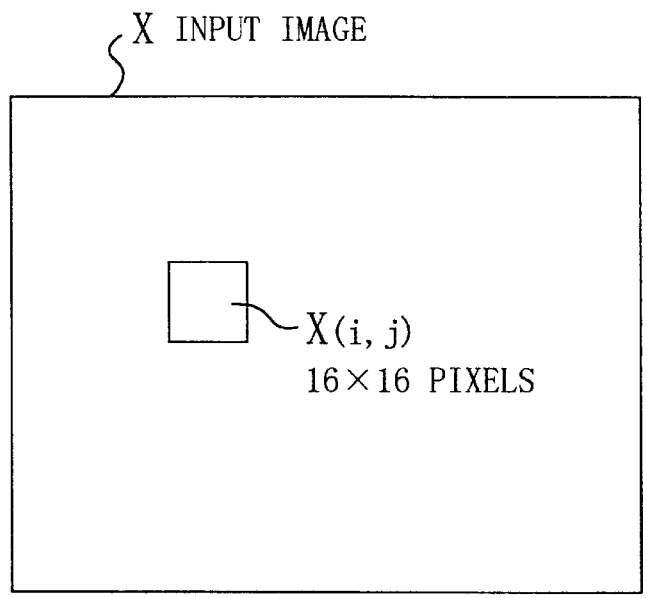
FIG. 1A is a diagram of a block to be processed (comprising 16×16 pixels) used in detection of a motion vector in an input image.
Figure 1B:
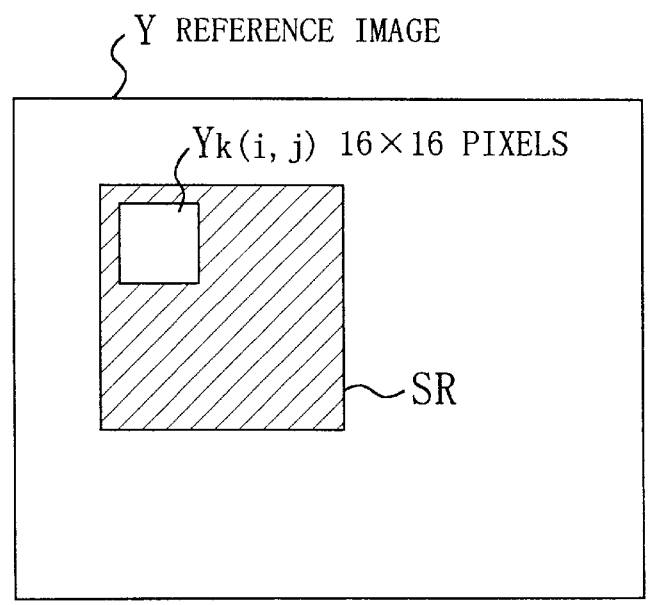
FIG. 1B is a diagram of a prospective reference block (comprising 16×16 pixels) in a search range for a motion vector in a reference image.

First, block matching adopted for detecting a motion vector will be described. FIG. 1A shows one block X (i, j) to be processed in the motion vector detection in an input image, and FIG. 1B shows one prospective reference block $Y_k$ (i, j) in a search range for a motion vector in a reference image. Specifically, one block X (i, j) to be processed comprising 16×16 pixels is extracted from an input image X, and a kth prospective reference block $Y_k$ (i, j) comprising 16×16 pixels is extracted from a search range SR in a reference image Y, wherein k is an integer depending upon the size of the search range SR, and i=0, . . . , or 3, and j=0, . . . , or 63. After extracting the block X (i, j) to be processed and the prospective reference block $Y_k$ (i, j), an evaluation value corresponding to the similarity between these blocks is calculated. With regard to other prospective reference blocks having the same size in the search range SR, their evaluation values are calculated in the same manner. Then, the prospective reference block having the minimum evaluation value, namely, the prospective reference block most similar to the block to be processed, is selected as a reference block. Ultimately, a motion vector corresponding to the positional relationship between the block to be processed and the reference block is determined.

FIG. 2 shows a method of obtaining four differential sub blocks $Z_k$ (0, j) $Z_k$ (1, j), $Z_k$ (2, j) and $Z_k$ (3, j) to be subjected to the DCT. In FIG. 2, the following relationship holds:

$$Z_k(i, j)=(i, j)-Y_k(i, j)$$

wherein i (=0, . . . , or 3) indicates a number of a processing unit in the DCT, and j (=0, . . . , or 63) indicates a number of pixels in the processing unit in the DCT. At this point, average values $X_a$ (i), $Y_{ka}$ (i) and $Z_{ka}$ (i) are defined as:

$$X_a(i)=(1/64)\Sigma_{j=0}^{63}X(i, j)$$

$$Y_{ka}(i)=(1/64)\Sigma_{j=0}^{63}Y_k(i, j)$$

$$Z_{ka}(i)=(1/64)\Sigma_{j=0}^{63}Z_k(i, j)$$

Furthermore, when the DCT result of the differential sub block $Z_k$ (i, j) is indicated as $D_k$ (i, j), the following relationship holds due to the characteristic of the DCT:

$$\Sigma_{i=0 3}\Sigma_{j=063}(Z_k(i, j)-Z_{ka}(i))^2 = \Sigma_{i=0}^3 \Sigma_{j=0}^{63}(D_k(i, j))^2$$

Therefore, in order to minimize the sum of squares of AC components of the DCT result shown in the right side, an evaluation value $S_k$, which is shown as the sum of squares in the left side, should be minimized. The evaluation value $S_k$ can be calculated by using any of the following formulas:

$$S_k=\Sigma_{i=0}^3\Sigma_{j=0}^{63}(Z_k(i, j)-Z_{ka}(i))^2$$

$$S_k=\Sigma_{i=0}^3\Sigma_{j=0}^{63}(X(i, j)-X_a(i)-(Y_k(i, j)-Y_{ka}(i))^2$$

$$S_k=\Sigma_{i=0}^3\Sigma_{j=0}^{63}(X(i, j)-Y_k(i, j)-(X_a(i)-Y_{ka}(i))^2$$

$$S_k=\Sigma_{i=0}^3(\Sigma_{j=0}^{63}(Z_k(i, j))^2-64(Z_{ka}(i))^2)$$

Figure 3:
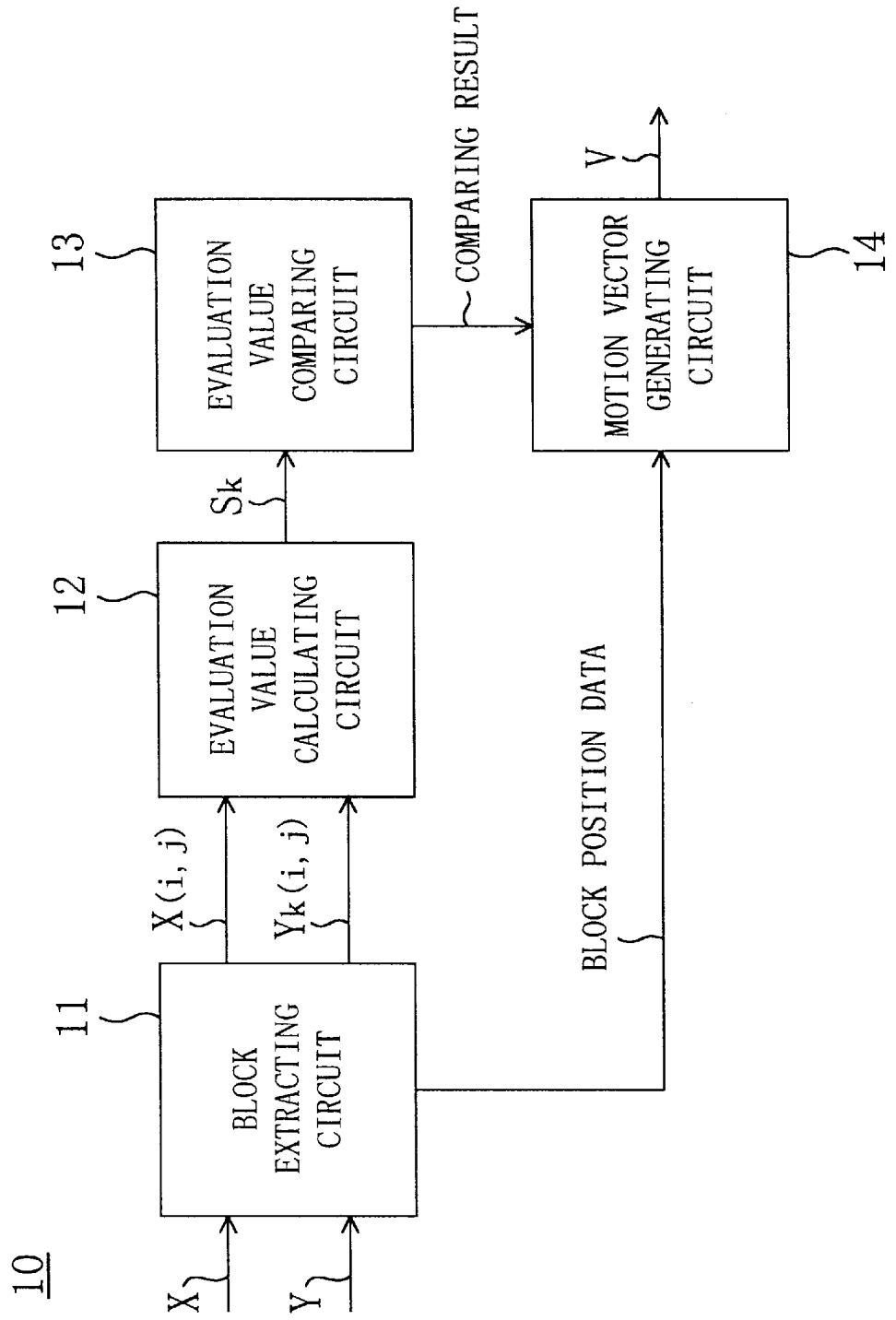
FIG. 3 is a block diagram for showing an exemplified configuration of a motion vector detecting circuit according to the invention.

FIG. 3 shows an exemplified configuration of the motion vector detecting circuit of the invention. The motion vector detecting circuit 10 of FIG. 3 comprises a block extracting circuit 11, an evaluation value calculating circuit 12, an evaluation value comparing circuit 13, and a motion vector generating circuit 14. The block extracting circuit 11 extracts the block X (i, j) to be processed from the input image X, and also extracts the prospective reference block $Y_k$ (i, j) from the reference image Y. The evaluation value calculating circuit 12 calculates the evaluation value $S_k$. The evaluation value is similarly calculated by the evaluation value calculating circuit 12 with regard to each of other prospective reference blocks. The evaluation value comparing circuit 13 compares the evaluation values of the plural prospective reference blocks, so that the prospective reference block having the minimum evaluation value, namely, the prospective reference block most similar to the block to be processed, can be selected as the reference block among the plural prospective reference blocks. The motion vector generating circuit 14 generates the motion vector V corresponding to the positional relationship between the block to be processed and the reference block, on the basis of the result of the comparison and block position data supplied by the block extracting circuit 11.

Figure 4:
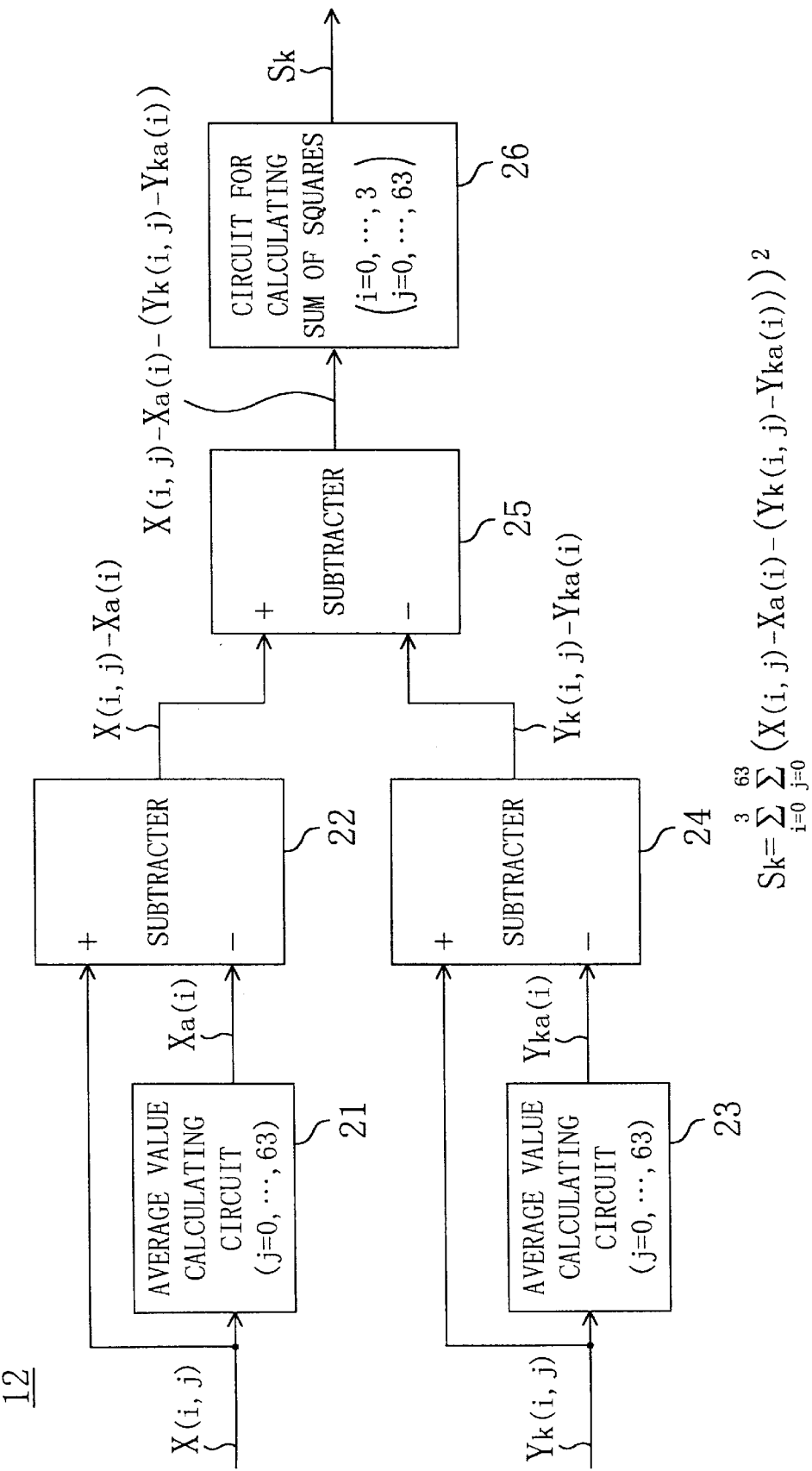
FIG. 4 is a block diagram for showing an exemplified inside configuration of an evaluation value calculating circuit of FIG. 3.
Figure 5A:
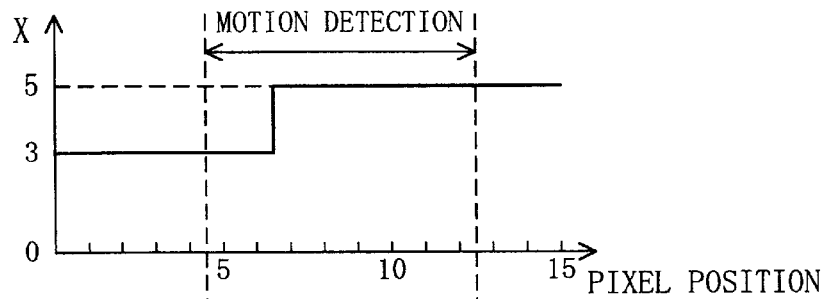
FIGS. 5A through 5E are timing charts for illustrating the operation of the motion vector detecting circuit of FIG. 3.
Figure 5B:
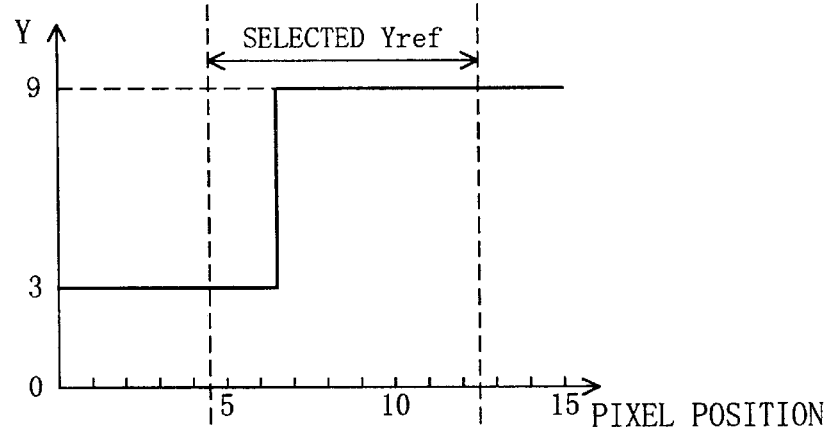
Figure 5C:
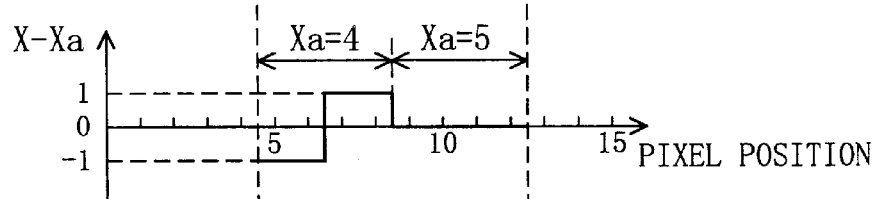
Figure 5D:
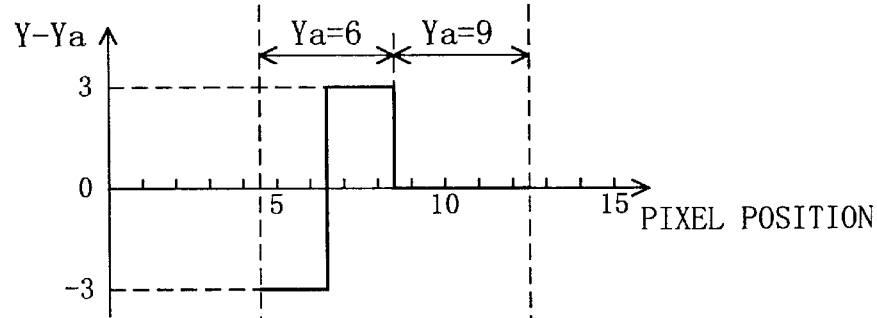
Figure 5E:
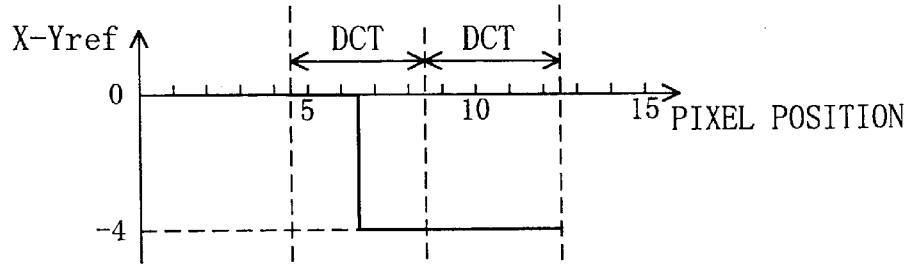
Figure 6A:
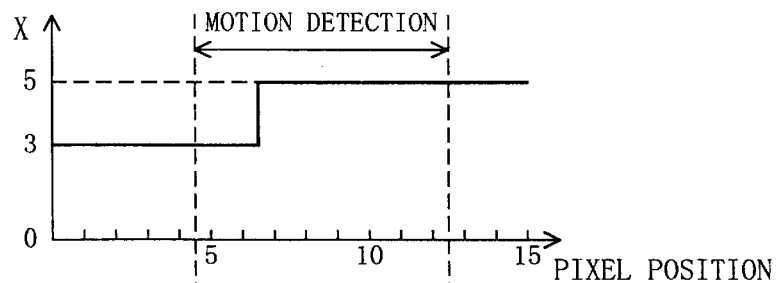
FIGS. 6A through 6E are timing charts for illustrating an exemplified operation of a conventional motion vector detecting circuit.
Figure 6B:
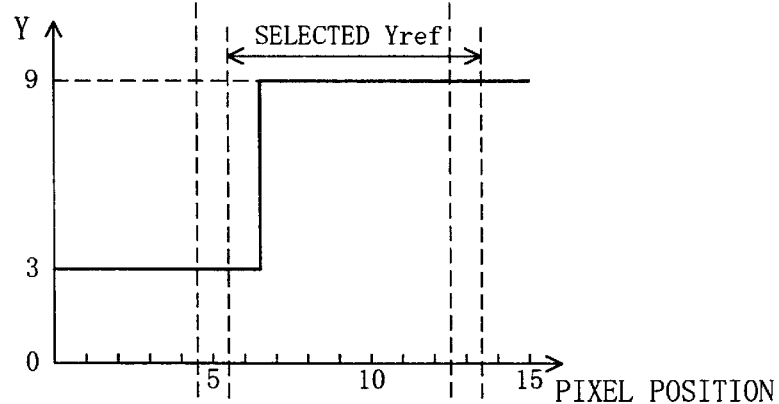
Figure 6C:
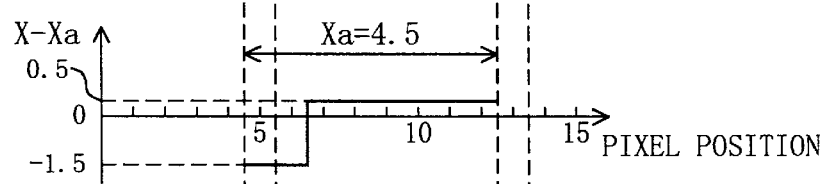
Figure 6D:
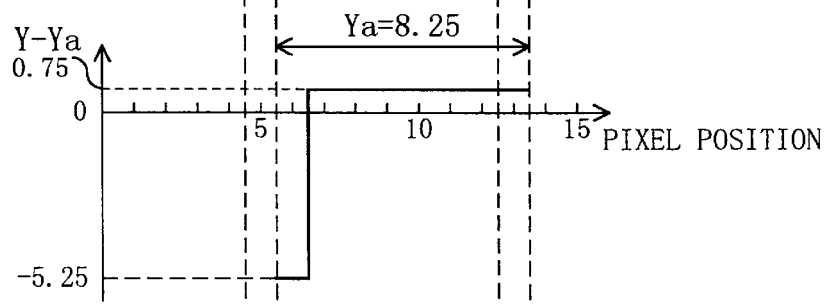
Figure 6E:
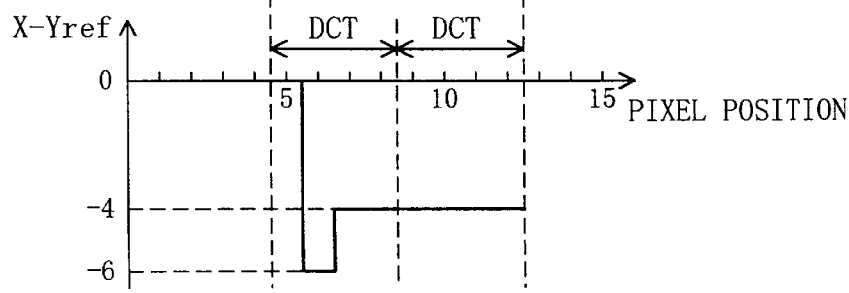

FIG. 4 shows an exemplified inside configuration of the evaluation value calculating circuit 12 of FIG. 3. In FIG. 4, a reference numeral 21 denotes a circuit for calculating the average value $X_a$ (i), a reference numeral 22 denotes a subtracter for calculating a difference between X (i, j) and $X_a$ (i), a reference numeral 23 denotes a circuit for calculating the average value $Y_{ka}$(i), a reference numeral 24 denotes a subtracter for calculating a difference between $Y_k$ (i, j) and $Y_{ka}$ (i), a reference numeral 25 denotes a subtracter for calculating X (i, j)–$X_a$ (i)–(Y (i, j)–Y (i) ), and a reference numeral 26 denotes a circuit for calculating the sum of squares $\Sigma_{i=0}^3 \Sigma_{j=0}^{63}$ (X (i, j)–$X_a$ (i)–($Y_k$ (i, j)–$Y_{ka}$ (i) ))$^2$. It is noted that the sum of squares can be replaced with a sum of absolute values $\Sigma_{i=0}\Sigma_{j=0}^{63}$|X (i, j)–$X_a$ (i)–($y_k$ (i, j)–$Y_{ka}$ (i))| as the evaluation value.

FIGS. 5A through 5E show the operation of the motion vector detecting circuit 10 of FIG. 3, wherein a unit for detecting the motion vector is 8 pixels, a DCT unit is 4 pixels and a search range is ±1 pixels for the sake of simplification. In this case, it is assumed that there is an object having brightness of "3" in front of a background, that the object does not move, and that the brightness of the background alone is changed from "9" to "5". In this exemplified case, an average value of 4 pixels as a unit is used, and hence, as the reference block $Y_{ref}$ of the block to be processed, comprising 8 pixels from No. 5 to No. 12 in the input image X, a block comprising 8 pixels from No. 5 to No. 12 in the reference image Y is selected, and the movement is judged to be 0. As a result, an AC component of the DCT input X–$Y_{ref}$ is small. On the other hand, FIGS. 6A through 6E show an exemplified conventional operation adopted in the case where an average value of 8 pixels as a unit is used. In this case, as the reference block $Y_{ref}$ of the block to be processed, comprising 8 pixels from No. 5 to No. 12 in the input image X, a block comprising 8 pixels from No. 6 to No. 13 in the reference image Y is selected, and the movement is judged to be 1 in error. As a result, an AC component of the DCT input X–$Y_{ref}$ is large. Thus, this invention can improve the quality of the image as compared with the conventional technique.

FIG. 7 shows another exemplified inside configuration of the evaluation value calculating circuit 12. In FIG. 7, a reference numeral 31 denotes a subtracter for calculating a difference between X (i, J) and $Y_k$ (i, j), a reference numeral 32 denotes a circuit for calculating the average value $X_a$ (i), a reference numeral 33 denotes a circuit for calculating the average value $Y_{ka}$ (i), a reference numeral 34 denotes a subtracter for calculating a difference between $X_a$ (i) and $Y_{ka}$ (i), a reference numeral 35 denotes a subtracter for calculating X (i, J)−$Y_k$ (i, j)−($X_a$ (i)−$Y_{ka}$ (i)), and a reference numeral 36 denotes a circuit for calculating the sum of squares $\Sigma_{i=0}^{3}\Sigma^{63}$ (X (i, j)−Y (i, j)−(X (i)−Y (i) ))$^2$. It is noted that the sum of squares can be replaced with the sum of absolute values $\Sigma_{i=0}^{3}\Sigma_{j=0}^{63}$|X (i, i)−$Y_k$ (i, j)−($X_a$(i) −$Y_{ka}$ (i))| as the evaluation value.

FIG. 8 shows still another exemplified inside configuration of the evaluation value calculating circuit 12. In FIG. 8, a reference numeral 41 denotes a subtracter for calculating a difference $Z_k$ (i, j), a reference numeral 42 denotes a circuit for calculating the average value $Z_{ka}$ (i), a reference numeral 43 denotes a subtracter for calculating a difference between $Z_k$ (i, j) and $Z_{ka}$ (i), and a reference numeral 44 denotes a circuit for calculating the sum of squares $\Sigma_{i=0}^{3}\Sigma_{j=0}^{63}$ ($Z_k$ (i, j)−$Z_{ka}$ (i))$^2$. It is noted that the sum of squares can be replaced with the sum of absolute values $\Sigma_{i=0}^{3}\Sigma_{j=0}^{63}$|$Z_k$ (i, j)−$Z_{ka}$ (i)| as the evaluation value.

Figure 9:
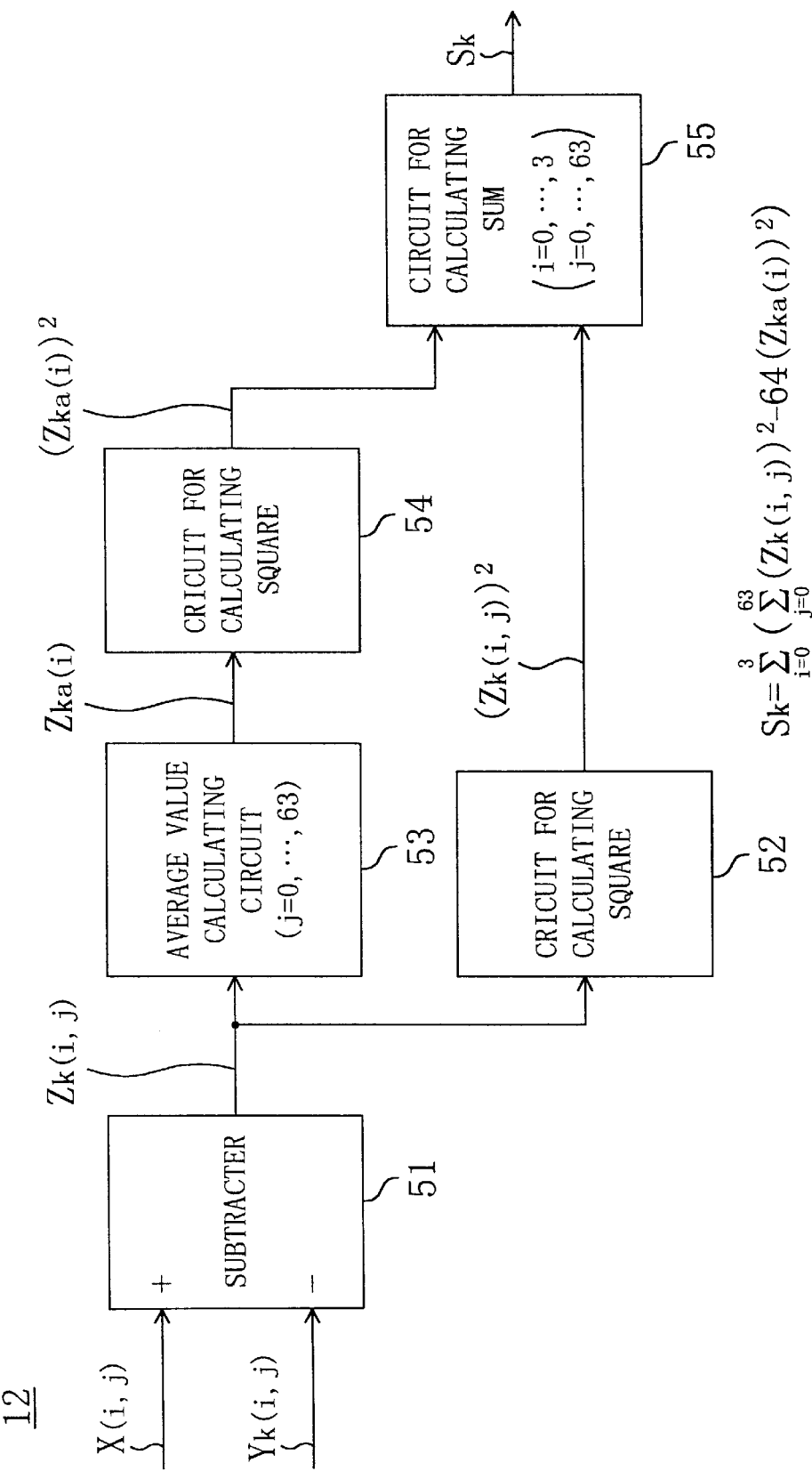
FIG. 9 is a block diagram for showing still another exemplified inside configuration of the evaluation value calculating circuit of FIG. 3.

FIG. 9 shows still another exemplified inside configuration of the evaluation value calculating circuit 12. In FIG. 9, a reference numeral 51 denotes a subtracter for calculating the difference $Z_k$ (i, J), a reference numeral 52 denotes a circuit for calculating a square ($Z_k$ (i, j) )$^2$, a reference numeral 53 denotes a circuit for calculating the average value $Z_{ka}$ (i), a reference numeral 54 denotes a circuit for calculating a square ($Z_{ka}$ (i ))$^2$, and a reference numeral 55 denotes a circuit for calculating a sum $\Sigma_{i=0}^{3}(\Sigma_{j=0}^{63}$ ($Z_k$ (i, j)$^2$−64($Z_{ka}$ (i))$^2$).

So far, various configurations of the evaluation value calculating circuit 12 have been described. Next, reduction of the calculation in the evaluation value calculating circuit 12 will be described.

Figure 10:
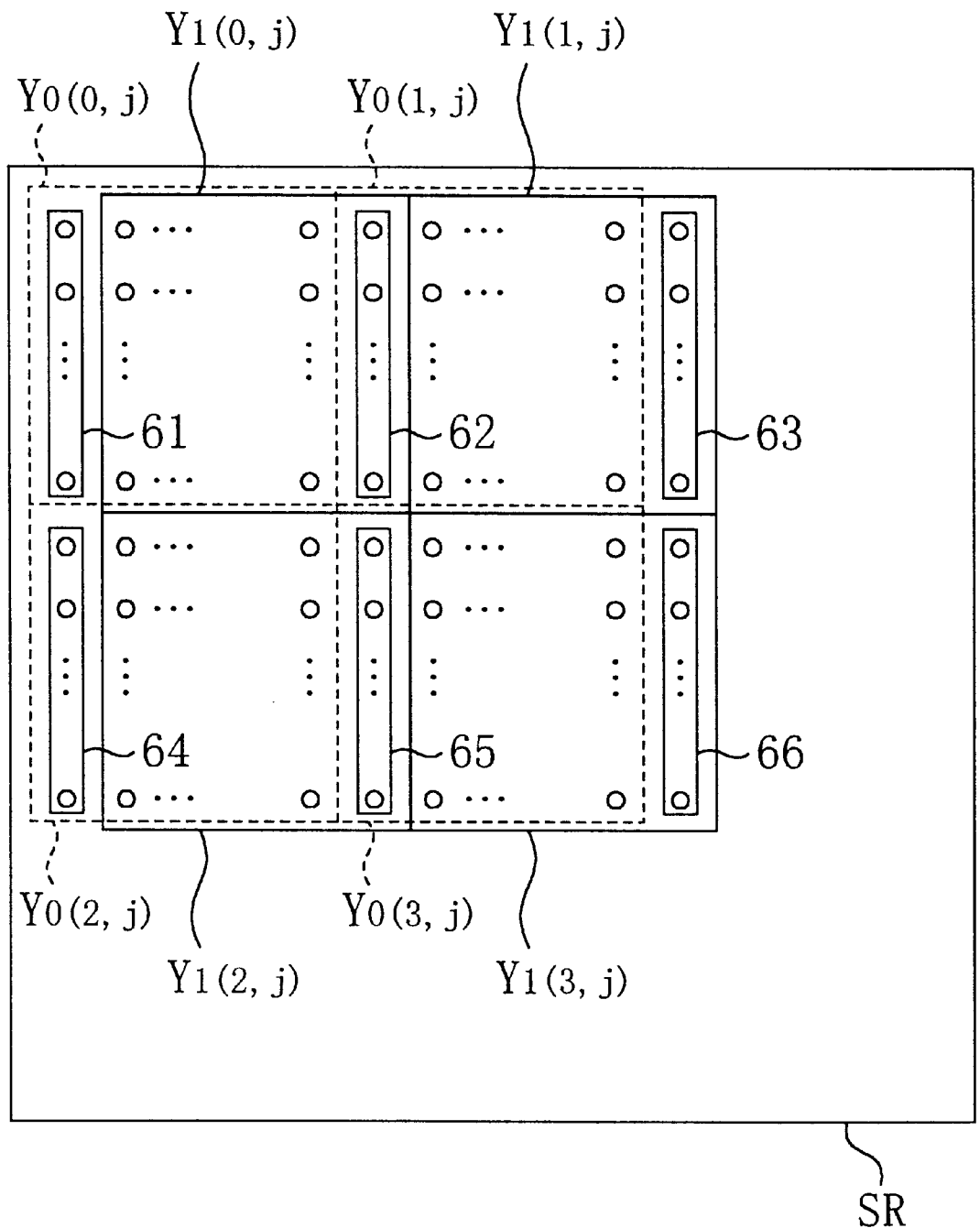
FIG. 10 is a diagram of two prospective reference blocks (each comprising 16×16 pixels) in a search range for a motion vector in a reference image.

FIG. 10 shows two prospective reference blocks $Y_0$ (i, j) and $Y_1$ (i, j) each comprising 16×16 pixels in the motion vector search range SR in the reference image. The second prospective reference block $Y_1$ (i, j) is shifted from the first prospective reference block $Y_0$ (i, j) in the rightward direction by one pixel. In FIG. 10, each of reference numerals 61, 62, 63, 64, 65 and 66 denotes a pixel column (differential column) comprising 8 pixels. In this case, four sub blocks $Y_0$ (0, j), $Y_0$ (1, j), $Y_0$ (2, j) and $Y_0$ (3, j) are assumed to have average pixel values of $Y_{0a}$ (0), $Y_{0a}$ (1), $Y_{0a}$ (2) and $Y_{0a}$ (3), respectively, and other four sub blocks $Y_1$ (0, j), $Y_1$ (1, j), $Y_1$ (2, j) and $Y_1$ (3, j) are assumed to have average pixel values of $Y_{1a}$ (0), $Y_{1a}$ (1), $Y_{1a}$ (2) and $Y_{1a}$ (3), respectively. According to this invention, the average value $Y_{1a}$ (0) is obtained by subtracting ⅛ of the average value of the pixel column 61 from the average value $Y_{0a}$ (0) and adding ⅛ of the average value of the pixel column 62 to the result of the subtraction. The average value $Y_{1a}$ (1) is obtained by subtracting ⅛ of the average value of the pixel column 62 from the average value $Y_{0a}$ (1) and adding ⅛ of the average value of the pixel column 63 to the result of the subtraction. Also, the other two average values $Y_{1a}$ (2) and Y (3) are similarly obtained. Therefore, the calculation can be reduced as compared with the case where the average values of the four sub blocks of the first prospective reference block $Y_0$ (i, j) are not used. Alternatively, in the calculation of four average values of a prospective reference block shifted downward by one pixel from the first prospective reference block $Y_0$ (i, j), the four average values of the first prospective reference block $Y_0$ (i, j) can be used.

Figure 11:
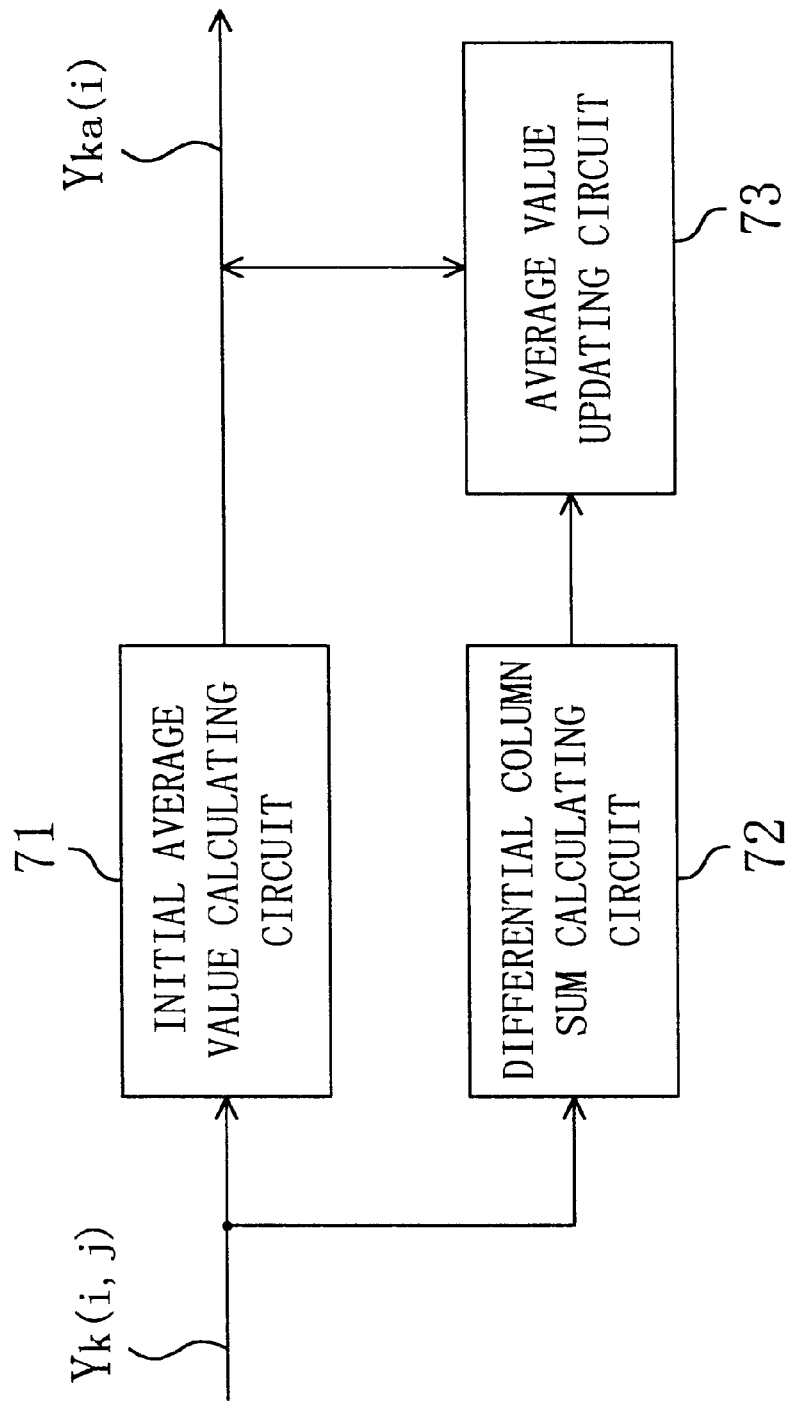
FIG. 11 is a block diagram for showing an exemplified inside configuration of an average value calculating circuit of FIG. 4.

FIG. 11 shows an exemplified inside configuration of the average value calculating circuit 23 of FIG. 4. In FIG. 11, a reference numeral 71 denotes an initial average value calculating circuit, a reference numeral 72 denotes a differential column sum calculating circuit, and a reference numeral 73 denotes an average value updating circuit. The initial average value calculating circuit 71 calculates the four average values $Y_{0a}$ (0), $Y_{0a}$ (1), $Y_{0a}$ (2) and $Y_{0a}$ (3). These four average values are used for calculating the evaluation value $S_0$ of the first prospective reference block $Y_0$ (i, j). The differential column sum calculating circuit 72 calculates a sum of pixel values in the six pixel columns (differential columns) 61, 62, 63, 64, 65 and 66. The average value updating circuit 73 subtracts ⅟₆₄ of a sum of the pixel column 61 from the average value $Y_{0a}$ (0) and adds ⅟₆₄ of a sum of the pixel column 62 to the result of the subtraction, thereby calculating the average value $Y_{1a}$ (1). The other three average values $Y_{1a}$ (1), $Y_{1a}$ (2) and $Y_{1a}$ (3) are similarly calculated by the average value updating circuit 73.

Figure 12:
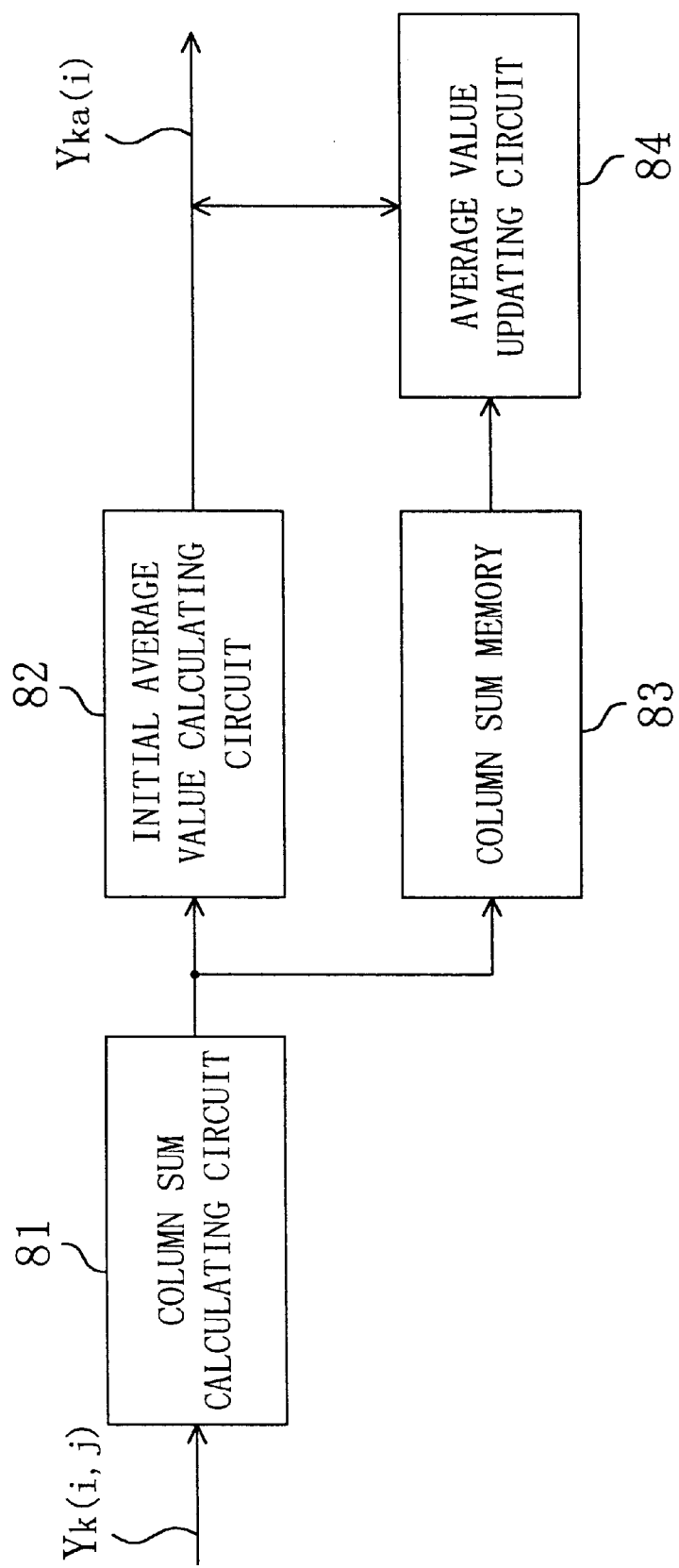
FIG. 12 is a block diagram for showing another exemplified inside configuration of the average value calculating circuit of FIG. 4.

FIG. 12 shows another exemplified inside configuration of the average value calculating circuit 23. In FIG. 12, a reference numeral 81 denotes a column sum calculating circuit, a reference numeral 82 denotes an initial average value calculating circuit, a reference numeral 83 denotes a column sum memory, and a reference numeral 84 denotes an average value updating circuit. The column sum calculating circuit 81 calculates a sum of each of 32 pixel columns (including the four differential columns 61, 62, 64 and 65) each comprising 8 pixels in the first prospective reference block $Y_0$ (i, j). The sums of these 32 pixel columns are supplied to the initial average value calculating circuit 82 and stored in the column sum memory 83. The initial average value calculating circuit 82 calculates the four average values $Y_{0a}$ (0), $Y_{0a}$ (1), $Y_{0a}$ (2) and $Y_{0a}$ (3) by using the supplied sums. These four average values are used for calculating the evaluation value $S_0$ of the first prospective reference block $Y_0$ (i, j). Next, the column sum calculating circuit 81 calculates sums of the two differential columns 63 and 66. The average value updating circuit 84 subtracts ⅟₆₄ of the sum of the pixel column 61 from the average value $Y_{0a}$ (0) and adds ⅟₆₄ of the sum of the pixel column 62 to the result of the subtraction, thereby calculating the average value $Y_{1a}$ (1). The other three average values $Y_{1a}$ (1), $Y_{1a}$ (2) and $Y_{1a}$ (3) are similarly calculated by the average value updating circuit 84.

Figure 13:
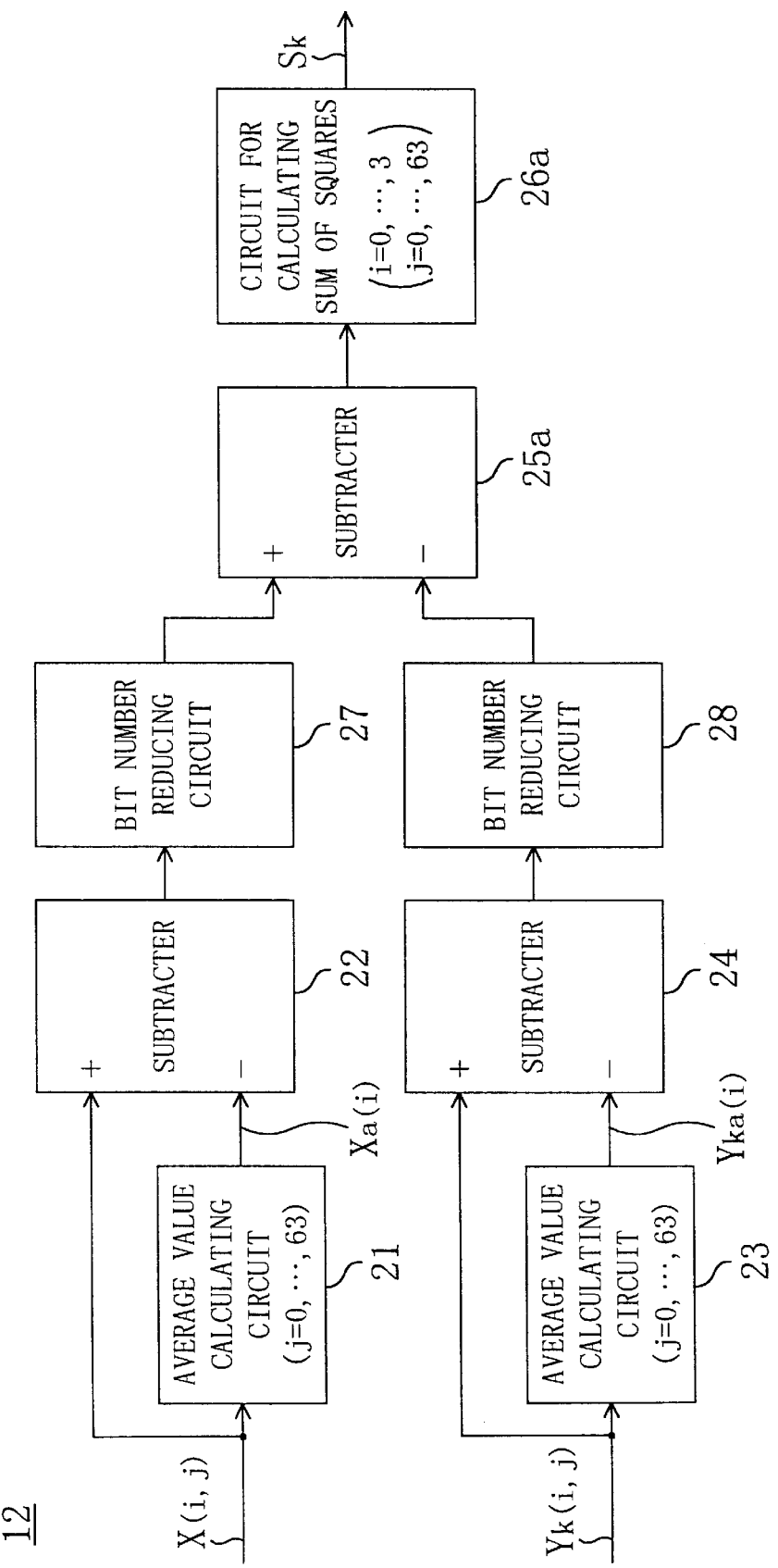
FIG. 13 is a block diagram for showing modification of the evaluation value calculating circuit of FIG. 4.

FIG. 13 shows modification of the evaluation value calculating circuit 12 of FIG. 4. In FIG. 13, a reference numeral 27 denotes a circuit for reducing the bit number of the difference X(i, j)−$X_a$ (i) supplied by the subtracter 22, and a reference numeral 28 denotes a circuit for reducing the bit number of the difference $Y_k$ (i, j)−Y (i) supplied by the subtracter 24. The simplest method of reducing the bit number is binarization. In this case, each of the bit number reducing circuits 27 and 28 outputs 0 or 1, and hence, the circuit configurations of a subtracter 25a and a circuit 26a for calculating a sum of squares disposed at the subsequent levels can be simplified. In other words, the addition of squares or absolute values results in calculation of exclusive OR (EOR) as follows:

$$\Sigma_{i=0}^{3}\Sigma_{j=0}^{63}((X(i, j)-X_a(i))EOR((Y_k(i, j)-(Y_{ka}(i)))$$

Figure 14:
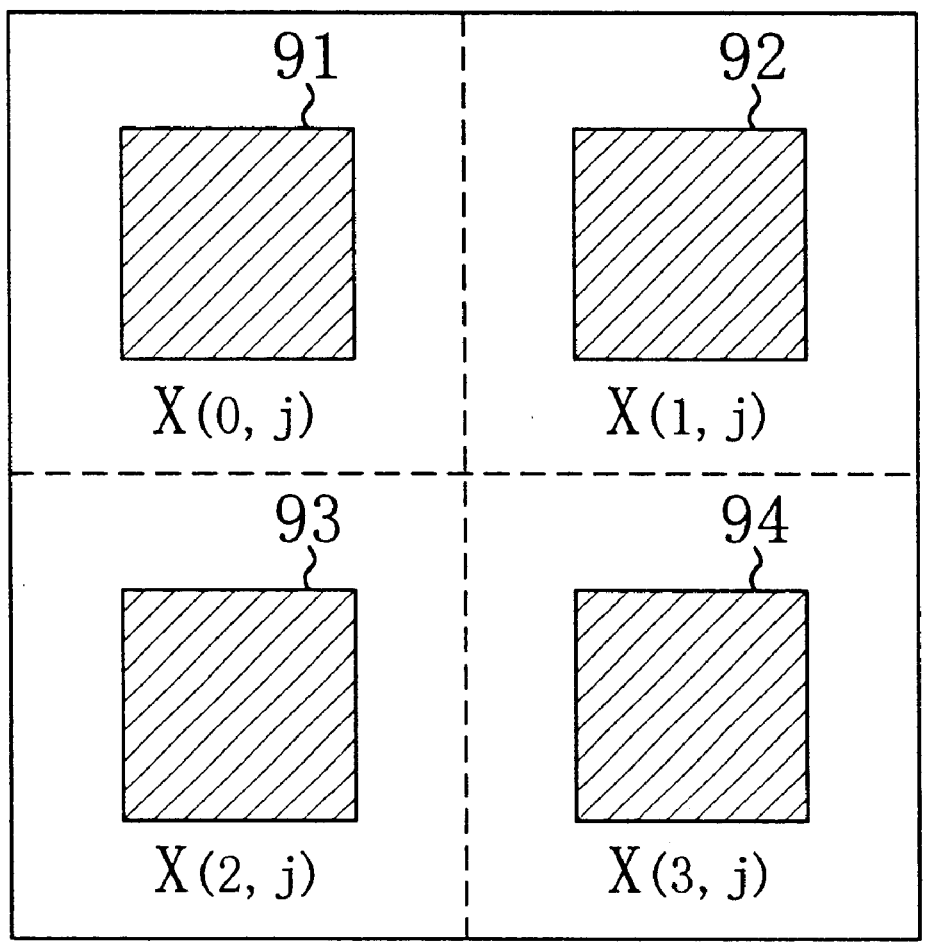
FIG. 14 is a diagram for showing limited pixels to be processed in each of four sub blocks (each comprising 8×8 pixels) in one block to be processed.

FIG. 14 shows pixels to be processed in four sub blocks X(0, j) X(1, j), X(2, j) and X(3, j) in a block to be processed, where j is limited. For the purpose of reducing the calculation, in the sub block X(0, j) comprising 8×8 pixels, merely an area 91 comprising 4×4 pixels adjacent to one another and disposed in the center of the sub block is selected for the calculation of the evaluation value. Also in the other three sub blocks X(1, j), X(2, j) and X(3, j), areas to be processed are similarly limited to areas 92, 93 and 94, respectively. Also in four sub blocks $Y_k$ (0, j), $Y_k$ (1, j), $Y_k$ (2, j) and $Y_k$ (3, j) in each of the prospective reference blocks, j is similarly limited.

Figure 15:
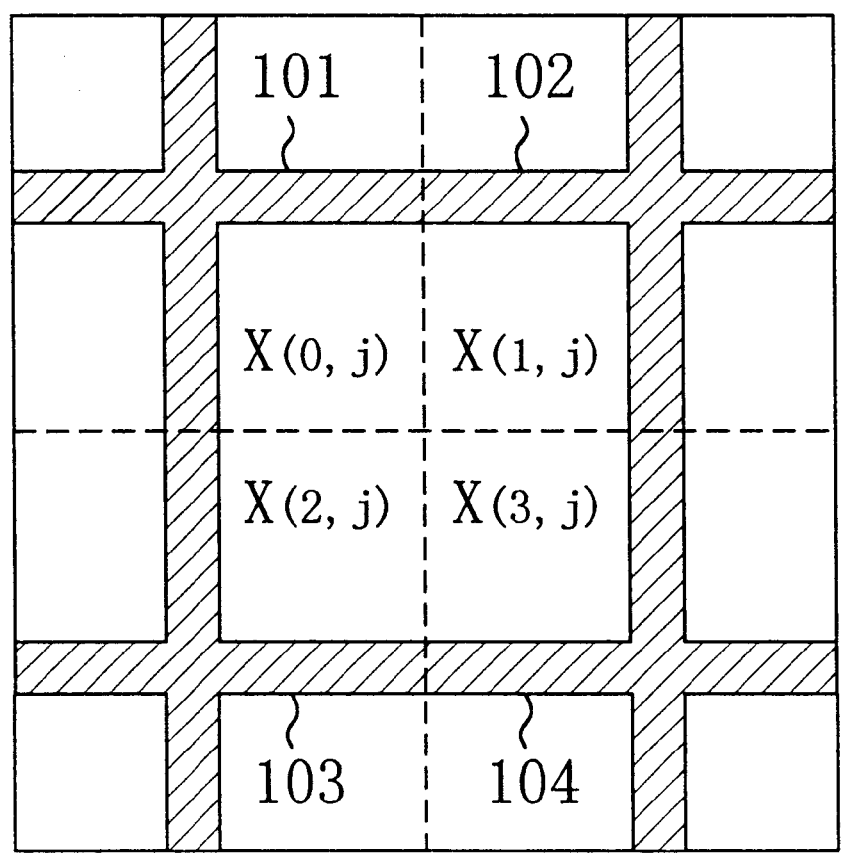
FIG. 15 is a diagram for showing modification of the limited pixels of FIG. 14.

FIG. 15 shows modification of the areas to be processed of FIG. 14. In FIG. 15, for the purpose of reducing the calculation, in the sub block X (0, j) comprising 8×8 pixels, merely an area 101 comprising 15 pixels adjacent to one another and positioned in a crosswise manner is selected for the calculation of the evaluation value. Also in the other three sub blocks X(1, j), X(2, j) and X(3, j), the areas to be processed are similarly limited to areas 102, 103 and 104, respectively. In the areas shown in both FIGS. 14 and 15, the pixels adjacent to one another are selected, and hence, a high frequency component of the image can be retained.

FIG. 16 shows another modification of the evaluation value calculating circuit 12 of FIG. 4. In FIG. 16, an area limiting circuit 29 supplies a j limiting signal in accordance with the limitation shown in FIG. 14 or 15 to the subtracters 22, 24 and 25 and the circuit 26 for calculating a sum of squares.

In the description given so far, each prospective reference block $Y_k$ (i, j) is provided with one evaluation value $S_k$. However, the evaluation value can be provided to each of the sub blocks.

Figure 17A:
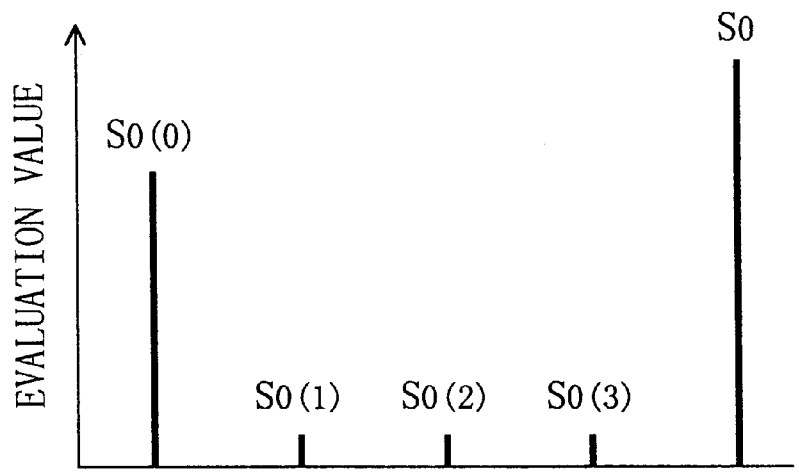
FIG. 17A is a diagram of five evaluation values obtained from one prospective reference block.
Figure 17B:
FIG. 17B is a diagram of five evaluation values obtained from another prospective reference block.

FIG. 17A shows five evaluation values obtained in the first prospective reference block $Y_0$ (i, j), and FIG. 17B shows five evaluation values obtained in the second prospective reference block $Y_1$ (i, j). At this point, when k=0 or 1, and i=0, . . . , or 8, the evaluation value $S_k$ can be obtained as follows:

$$S_k = \Sigma_{i=0}^{3} \Sigma_{j=0}^{63} (X(i, j) - X_a(i) - (Y_k(i, j) - Y_{ka}(i)))^2$$

$$S_k = \Sigma_{j=0}^{63} (X(i, j) - X_a(i) - (Y_k(i, j) - Y_{ka}(i)))^2$$

Specifically, the four sub blocks $Y_0$ (0, j), Y (1, j), Y (2, j) and $Y_0$ (3, j) of the first prospective reference block Y (i, j) are assumed to have intermediate evaluation values $S_0(0)$, $S_0(1)$, $S_0(2)$ and $S_0(3)$, respectively, and the four sub blocks $Y_1(0, j)$, $Y_1(2, j)$, $Y_1(2, j)$ and $Y_1(3, j)$ of the second prospective reference block $Y_1$ (i, j) are assumed to have intermediate evaluation values $S_1(0)$, $S_1(1, S_1(2)$ and $S_1(3)$, respectively. In the case shown in FIGS. 17A and 17B, the evaluation value $S_1$ is smaller than the evaluation value S, and therefore, the second prospective reference block $Y_1$ (i, j) is selected as the reference block when a unit of 16×16 pixels is adopted. However, since the evaluation value $S_0(1)$ is smaller than the evaluation value $S_1(1)$, the evaluation value $S_0(2)$ is smaller than the evaluation value $S_1(2)$, and the evaluation value S(3) is smaller than the evaluation value $S_1(3)$, the first prospective reference block $Y_0$ (i, j) is more suitably selected as the reference block. In the following embodiment, this inconsistency is taken into consideration.

Figure 18:
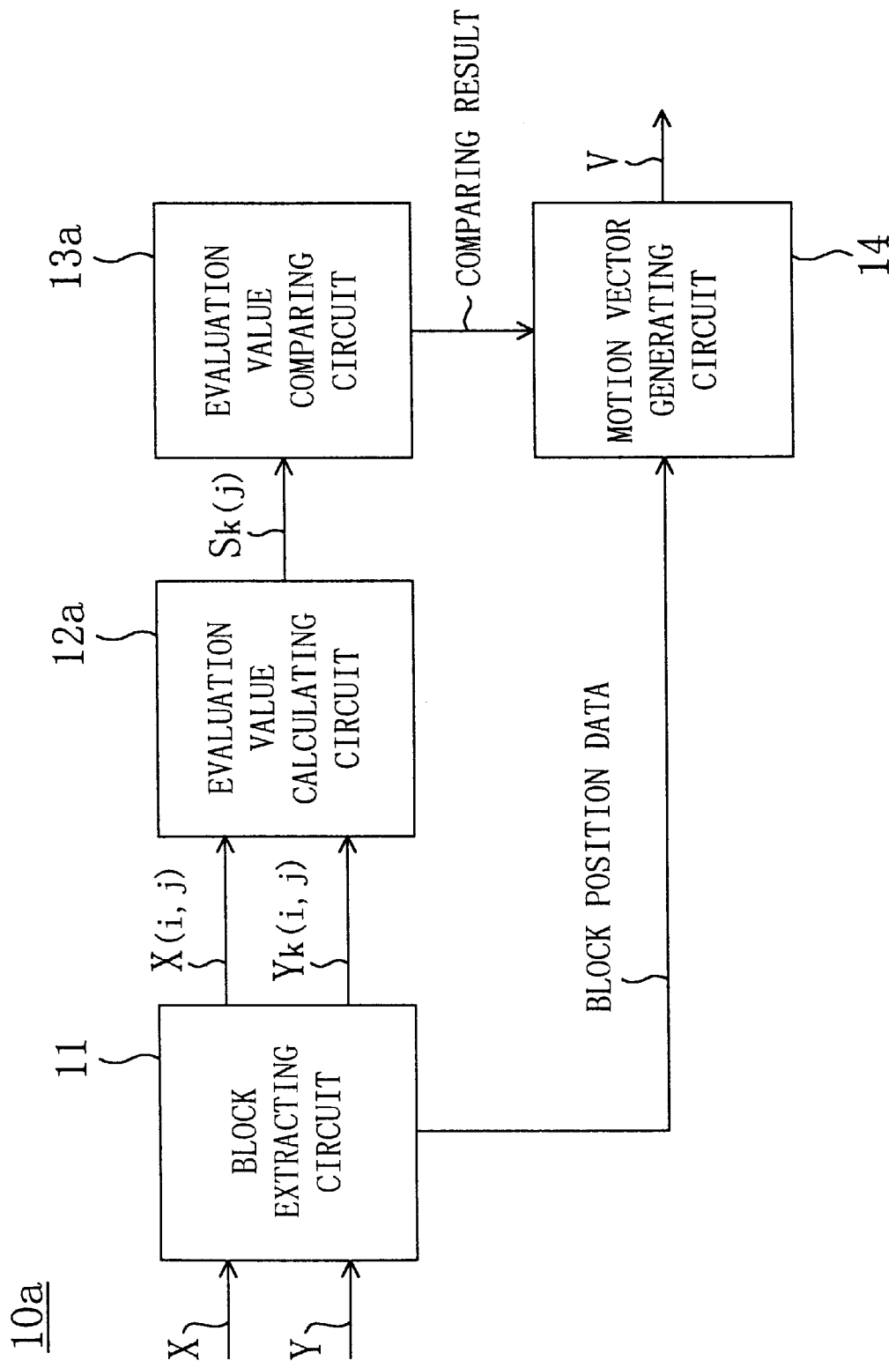
FIG. 18 is a block diagram for showing another exemplified configuration of the motion vector detecting circuit of the invention.

FIG. 18 shows another exemplified configuration of the motion vector detecting circuit of the invention. The motion vector detecting circuit 10a of FIG. 18 comprises a block extracting circuit 11, an evaluation value calculating circuit 12a, an evaluation value comparing circuit 13a and a motion vector generating circuit 14. The block extracting circuit 11 extracts a block X (i, j) to be processed from an input image X, and also extracts a prospective reference block $Y_k$ (i, j) from a reference image $Y_0$ The evaluation value calculating circuit 12a calculates the aforementioned four intermediate evaluation values $S_k$ (i) with 8×8 pixels used as a unit. With regard to each of other prospective reference blocks, the evaluation value calculating circuit 12a similarly calculates four intermediate evaluation values. The evaluation value comparing circuit 13a adds up the three smaller intermediate evaluation values among the four intermediate evaluation values of the prospective reference block $Y_k$ (i, j), and defines the result of the addition as an ultimate evaluation value. With regard to the other prospective reference blocks, the evaluation value comparing circuit 13a defines their ultimate evaluation values. Then, the evaluation value comparing circuit 13a compares the ultimate evaluation values of the plural prospective reference blocks, so that the prospective reference block having the minimum ultimate evaluation value, namely, the prospective reference block most similar to the block to be processed, can be selected as the reference block. The motion vector generating circuit 14 generates a motion vector V corresponding to the positional relationship between the block to be processed and the reference block, on the basis of the result of the comparison and block position data supplied by the block extracting circuit 11. Alternatively, in the evaluation comparing circuit 13a, for example, two of the intermediate evaluation values excluding the maximum and minimum values among the four intermediate evaluation values of the prospective reference block $Y_k$ (i, j) can be added to each other, so that the result of the addition can be defined as the ultimate evaluation value.

What is claimed is:

1. A motion vector detecting circuit for detecting a motion vector in an input image and a reference image, said circuit comprising:

means for extracting, from said input image, a block to be processed which includes plural pixels;

means for dividing said block to be processed into plural sub blocks, each of said sub blocks having the same size as a processing unit in discrete cosine transform (DCT);

means for extracting, from a given search range in said reference image, plural prospective reference blocks each of which includes pixels in the same number as that of said pixels included in said block to be processed;

means for dividing each of said plural prospective reference blocks into plural sub blocks in the same number as that of said sub blocks of said block to be processed, each of said sub blocks of said plural prospective reference blocks having the same size as that of said sub blocks of said block to be processed;

calculating means for calculating, with regard to each of said plural prospective reference blocks, an evaluation value corresponding to similarity between said block to be processed and said prospective reference block by using a result obtained by subtracting an average value of pixels included in each of said sub blocks of said block to be processed from respective pixel values of each of said sub blocks of said block to be processed and by using a result obtained by subtracting an average value of pixels included in each of said sub blocks of said prospective reference block from respective pixel values of each of said sub blocks of said prospective reference block;

means for comparing said evaluation values of said plural prospective reference blocks in order to determine which of said plural prospective reference blocks is most similar to said block to be processed; and means for generating said motion vector on the basis of a result of comparison, wherein an image difference between each of sub blocks of said input image and each of sub blocks of said reference image is obtained by using said motion vector, and the DCT is carried out to the image difference so as to effect a reduction of an AC component included in the DCT result; and wherein said calculating means includes:
   means for calculating an average value of pixels included in each of said sub blocks of said block to be processed;
   means for obtaining a first intermediate block including pixels resulting from subtracting said average value of said pixels included in each of said sub blocks from respective pixel values of each of said sub blocks of said block to be processed;
   means for calculating an average value of pixels included in each of said sub blocks of said prospective reference block;
   means for obtaining a second intermediate block including pixels resulting from subtracting said average value of said pixels included in each of said sub blocks of said prospective reference block from respective pixel values of each of said sub blocks of said prospective reference block;
   means for obtaining a third intermediate block including pixels resulting from subtracting corresponding pixel values in said second intermediate block from pixel values in said first intermediate block; and
   means for calculating said evaluation value corresponding to the similarity between said block to be processed and said prospective reference block by using respective pixel values of said third intermediate block.

2. A motion vector detecting circuit for detecting a motion vector in an input image and a reference image, said circuit comprising:
   means for extracting, from said input image, a block to be processed which includes plural pixels;
   means for dividing said block to be processed into plural sub blocks, each of said sub blocks having the same size as a processing unit in discrete cosine transform (DCT);
   means for extracting, from a given search range in said reference image, plural prospective reference blocks each of which includes pixels in the same number as that of said pixels included in said block to be processed;
   means for dividing each of said plural prospective reference blocks into plural sub blocks in the same number as that of said sub blocks of said block to be processed, each of said sub blocks of said plural prospective reference blocks having the same size as that of said sub blocks of said block to be processed;
   calculating means for calculating, with regard to each of said plural prospective reference blocks, an evaluation value corresponding to similarity between said block to be processed and said prospective reference block by using a result obtained by subtracting an average value of pixels included in each of said sub blocks of said block to be processed from respective pixel values of each of said sub blocks of said block to be processed and by using a result obtained by subtracting an average value of pixels included in each of said sub blocks of said prospective reference block from respective pixel values of each of said sub blocks of said prospective reference block;
   means for comparing said evaluation values of said plural prospective reference blocks in order to determine which of said plural prospective reference blocks is most similar to said block to be processed; and
   means for generating said motion vector on the basis of a result of comparison, wherein an image difference between each of sub blocks of said input image and each of sub blocks of said reference image is obtained by using said motion vector, and the DCT is carried out to the image difference so as to effect a reduction of an AC component included in the DCT result; and wherein said calculating means includes:
   means for obtaining a first intermediate block including pixels resulting from subtracting corresponding pixel values of said prospective reference block from respective pixel values of said block to be processed;
   means for calculating an average pixel value in each of said sub blocks of said block to be processed;
   means for calculating an average pixel value in each of said sub blocks of said prospective reference block;
   means for obtaining an average difference in each of said sub blocks by subtracting said average pixel value in each of said corresponding sub blocks of said prospective reference block from said average pixel value in each of said sub blocks of said block to be processed;
   means for obtaining a second intermediate block including pixels resulting from subtracting said average difference in each of said sub blocks from respective pixel values in each of sub blocks of said first intermediate block; and
   means for calculating said evaluation value corresponding to the similarity between said block to be processed and said prospective reference block by using respective pixel values in said second intermediate block.

3. A motion vector detecting circuit for detecting a motion vector in an input image and a reference image, said circuit comprising:
   means for extracting, from said input image, a block to be processed which includes plural pixels;
   means for dividing said block to be processed into plural sub blocks, each of said sub blocks having the same size as a processing unit in discrete cosine transform (DCT);
   means for extracting, from a given search range in said reference image, plural prospective reference blocks each of which includes pixels in the same number as that of said pixels included in said block to be processed;
   means for dividing each of said plural prospective reference blocks into plural sub blocks in the same number as that of said sub blocks of said block to be processed, each of said sub blocks of said plural prospective reference blocks having the same size as that of said sub blocks of said block to be processed;
   calculating means for calculating, with regard to each of said plural prospective reference blocks, an evaluation value corresponding to similarity between said block to be processed and said prospective reference block by using a result obtained by subtracting an average value of pixels included in each of said sub blocks of said block to be processed from respective pixel values of each of said sub blocks of said block to be processed and by using a result obtained by subtracting an average value of pixels included in each of said sub blocks of said prospective reference block from respective pixel values of each of said sub blocks of said prospective reference block;

means for comparing said evaluation values of said plural prospective reference blocks in order to determine which of said plural prospective reference blocks is most similar to said block to be processed; and means for generating said motion vector on the basis of a result of comparison, wherein an image difference between each of sub blocks of said input image and each of sub blocks of said reference image is obtained by using said motion vector, and the DCT is carried out to the image difference so as to effect a reduction of an AC component included in the DCT result; and wherein said calculating means includes:
means for obtaining a first intermediate block including pixels resulting from subtracting corresponding pixel values in said prospective reference block from respective pixel values in said block to be processed;
means for calculating an average pixel value in each of sub blocks in said first intermediate block;
means for obtaining a second intermediate block including pixels resulting from subtracting said average pixel value in each of said sub blocks from respective pixel values in each of said sub blocks in said first intermediate block; and
means for calculating said evaluation value corresponding to the similarity between said block to be processed and said prospective reference block by using respective pixel values in said second intermediate block.

4. A motion vector detecting circuit for detecting a motion vector in an input image and a reference image, said circuit comprising:

means for extracting, from said input image, a block to be processed which includes plural pixels;

means for dividing said block to be processed into plural sub blocks, each of said sub blocks having the same size as a processing unit in discrete cosine transform (DCT);

means for extracting, from a given search range in said reference image, plural prospective reference blocks each of which includes pixels in the same number as that of said pixels included in said block to be processed;

means for dividing each of said plural prospective reference blocks into plural sub blocks in the same number as that of said sub blocks of said block to be processed, each of said sub blocks of said plural prospective reference blocks having the same size as that of said sub blocks of said block to be processed;

calculating means for calculating, with regard to each of said plural prospective reference blocks, an evaluation value corresponding to similarity between said block to be processed and said prospective reference block by using a result obtained by subtracting an average value of pixels included in each of said sub blocks of said block to be processed from respective pixel values of each of said sub blocks of said block to be processed and by using a result obtained by subtracting an average value of pixels included in each of said sub blocks of said prospective reference block from respective pixel values of each of said sub blocks of said prospective reference block;

means for comparing said evaluation values of said plural prospective reference blocks in order to determine which of said plural prospective reference blocks is most similar to said block to be processed; and means for generating said motion vector on the basis of a result of comparison, wherein an image difference between each of sub blocks of said input image and each of sub blocks of said reference image is obtained by using said motion vector, and the DCT is carried out to the image difference so as to effect a reduction of an AC component included in the DCT result; and wherein said calculating means includes:
means for obtaining a first intermediate block including pixels resulting from subtracting corresponding pixel values in said prospective reference block from respective pixel values of said block to be processed;
means for obtaining a second intermediate block including pixels resulting from calculating a square of each pixel value in said first intermediate block;
means for calculating an average pixel value in each of sub blocks in said first intermediate block;
means for calculating a square of said average pixel value in each of said sub blocks; and
means for calculating said evaluation value corresponding to the similarity between said block to be processed and said prospective reference block by using respective pixel values in said second intermediate block and by using a value obtained by multiplying said square of said average value of each pixel in each of said sub blocks by a number of pixels in each of said sub blocks.

5. A motion vector detecting circuit for detecting a motion vector in an input image and a reference image, said circuit comprising:

means for extracting, from said input image, a block to be processed which includes plural pixels;

means for dividing said block to be processed into plural sub blocks, each of said sub blocks having the same size as a processing unit in discrete cosine transform (DCT);

means for extracting, from a given search range in said reference image, plural prospective reference blocks each of which includes pixels in the same number as that of said pixels included in said block to be processed;

means for dividing each of said plural prospective reference blocks into plural sub blocks in the same number as that of said sub blocks of said block to be processed, each of said sub blocks of said plural prospective reference blocks having the same size as that of said sub blocks of said block to be processed;

calculating means for calculating, with regard to each of said plural prospective reference blocks, an evaluation value corresponding to similarity between said block to be processed and said prospective reference block by using a result obtained by subtracting an average value of pixels included in each of said sub blocks of said block to be processed from respective pixel values of each of said sub blocks of said block to be processed and by using a result obtained by subtracting an aver age value of pixels included in each of said sub blocks of said prospective reference block from respective pixel values of each of said sub blocks of said prospective reference block;

means for comparing said evaluation values of said plural prospective reference blocks in order to determine which of said plural prospective reference blocks is most similar to said block to be processed; and means for generating said motion vector on the basis of a result of comparison, wherein an image difference between each of sub blocks of said input image and each of sub blocks of said reference image is obtained by using said motion vector, and the DCT is carried out to the image difference so as to effect a reduction of an AC component included in the DCT result; and wherein said calculating means includes means for calculating, with regard to each of said plural prospective reference blocks, said evaluation value corresponding to the similarity between said block to be processed and said prospective reference block by calculating plural intermediate evaluation values respectively corresponding to similarity between said sub blocks of said block to be processed and said corresponding sub blocks of said prospective reference block and by using said plural intermediate evaluation values.

* * * * *